United States Patent
Isobe et al.

(10) Patent No.: US 7,741,413 B2
(45) Date of Patent: Jun. 22, 2010

(54) CURABLE COMPOSITIONS HAVING IMPROVED ADHESION PERFORMANCE

(75) Inventors: Yukio Isobe, Fukuoka-ken (JP); Masashi Horikiri, Kanagawa (JP); Atsushi Sudo, Tokyo (JP); Takeshi Endo, Yokohama (JP); Olaf Lammerschop, Krefeld (DE); Thomas Huver, Duesseldorf (DE)

(73) Assignee: Henkel KGaA (DE)

( * ) Notice: Subject to any disclaimer, the term of this patent is extended or adjusted under 35 U.S.C. 154(b) by 336 days.

(21) Appl. No.: 11/620,826

(22) Filed: Jan. 8, 2007

(65) Prior Publication Data

US 2007/0149726 A1 Jun. 28, 2007

Related U.S. Application Data

(63) Continuation of application No. PCT/EP2005/004334, filed on Apr. 22, 2005.

(30) Foreign Application Priority Data

Jul. 13, 2004 (EP) .................... 04016392

(51) Int. Cl.
*C08F 283/02* (2006.01)
*C08G 59/14* (2006.01)
*C08L 63/00* (2006.01)
*C08L 63/02* (2006.01)

(52) U.S. Cl. .............. 525/523; 525/533; 525/535; 528/106; 528/109; 528/113; 528/373; 528/377

(58) Field of Classification Search ............... 525/523, 525/533, 535; 528/106, 109, 113, 373, 377
See application file for complete search history.

(56) References Cited

U.S. PATENT DOCUMENTS 3,554,967 A 1/1971 Uelzmann

FOREIGN PATENT DOCUMENTS

| EP | 1 233 030 A1 | 8/2002 |
|---|---|---|
| EP | 1 431 329 A1 | 6/2004 |
| JP | 2001-288242 A | 10/2001 |
| JP | 2002-302530 A | 10/2002 |
| JP | 2002-317047 A | 10/2002 |
| JP | 2004-41227 A | 2/2003 |
| JP | 2003-64161 A | 3/2003 |
| JP | 2004-47191 A | 2/2004 |

OTHER PUBLICATIONS

Patent Abstracts of Japan, vol. 2003, No. 07, Jul. 3, 2003 for JP 2003 064161, Sumitomo Bakelite Co. Ltd., Mar. 5, 2003.
Patent Abstracts of Japan, vol. 2003, No. 12, Dec. 5, 2003 for JP 2004 047191, Kyocera Chemical Corp., Feb. 12, 2004.
Patent Abstracts of Japan for JP 2003-04127, Feb. 2, 2003, Sanyo Chem Ind Ltd.
Patent Abstracts of Japan for JP 2002-317047, Oct. 31, 2002, Sanyo Chem Ind Ltd.
Patent Abstracts of Japan for JP 2002-302530, Oct. 18, 2002, Sanyo Chem Ind Ltd.
Patent Abstracts of Japan for JP 2001-288242, Oct. 16, 2001, Sanyo Chem Int Ltd.
Apparent Shear Strength of Single-Lap-Joint Adhesively Bonded Metal Specimens by Tension Load (Metal-to-Metal), Bueth Verlag, ASTM D1002, pp. 1-5.

*Primary Examiner*—Duc Truong
(74) *Attorney, Agent, or Firm*—Mary K. Cameron

(57) ABSTRACT

The present invention relates to adhesion-improved, curable compositions comprising a cyclic ether, a cyclic thiocarbonate, an amine and a carboxylic acid. A method of making such compositions and their use in adhesives, sealants and coatings are also provided.

17 Claims, 2 Drawing Sheets

CURABLE COMPOSITIONS HAVING IMPROVED ADHESION PERFORMANCE

CROSS-REFERENCE TO RELATED APPLICATIONS

This application is a continuation under 35 USC Sections 365(c) and 120 of International Application No. PCT/EP2005/004334, filed 22 Apr. 2005 and published in English 16 Jan. 2006 as WO 2006/005386, which claims priority from European Application No. 04016392.5, filed 13 Jul. 2004, each of which is incorporated herein by reference in its entirety.

FIELD OF THE INVENTION

The present invention relates to amine curing epoxy formulations with an improved adhesion performance, a method of making such formulations and their use in adhesives, sealants and coatings.

BACKGROUND OF THE RELATED ART

Amine curing epoxy formulations as curable compositions are widely applied in the formulation of adhesives, sealants, and coatings. The curing reaction, which comprises the addition of amines and epoxides, suffers from its volume shrinkage up to levels as high as 7% shrinkage. The volume shrinkage during the curing reaction causes the formation of voids and micro-cracks in the cured material, and thus results in lowering the mechanical strength of the material. Especially in the application of adhesives, shrinkage causes contact failure between the adhesive and the substrate, thus leading to adhesion failure. In addition, moisture can reach the surface of the substrate through voids and cracks, causing corrosion of the surface.

As a method to reduce shrinkage during the curing reaction between epoxides and amines, the addition of cyclic (di) thiocarbonate is effective. However, the shrinkage values are still not satisfactory for high precision adhesive applications and thus must be improved. Furthermore, due to the high reactivity between cyclic dithiocarbonates (DTC) and amines, DTC immediately reacts with amine in the formulation, even at ambient temperature to cause the disadvantages of a short pot life of the formulation and when the curing reaction is too rapid, an increase of viscosity of the formulation before the amine-hardener is completely homogenized into the formulation.

Formulations containing epoxides, dithiocarbonates, and amino compounds have recently been examined by Sanyo Kasei Co. Ltd. in the Japanese Laid-Open Patent Applications Nos. JP2003-41227, JP2002-317047, JP2002-302530, and JP2001-288242.

JP2003-41227 describes a contact adhesive. Two surfaces, the first one being coated with a mixture of epoxides and DTC, the second one being coated with amines, can be adhered upon their contact. By separating DTC and amine, the reaction does not start until the two surfaces are contacted. However, the adhesion performance is affected by ambient conditions, because the curing reaction depends on the diffusion of the components of the curing composition.

JP2002-317047 describes the utilization of ketimines, which release the corresponding amine upon hydrolysis by moisture. With this technology, it is possible to control the reaction rate of DTC with amine. However, curable epoxy formulations using ketimines have a disadvantage when being used for shrinkage-sensitive applications. The regeneration of the corresponding amine from the ketimine generates volatile ketones, which will be released from the formulation upon curing reaction to cause volume shrinkage. Even if non-volatile ketones are formed, they will remain in the cured resin to cause a decrease in the resin's mechanical and chemical properties. This patent application further describes, that if needed, unsaturated carboxylic acids can be added for trapping the thiol group which is generated by the reaction of DTC with amines. However, the definition of "unsaturated carboxylic acid" in the description of the invention clarifies that a compound obtained by esterification of aliphatic alcohol or phenol with (meth)acrylic acid is meant and not the carboxylic acid itself.

JP2002-302530 claims a curable formulation composed of cyclic thio compounds, cyclic ethers, and a molecule having more than one nucleophilic group. The preferred nucleophilic group is the amino group. Carboxylate groups are described as candidate nucleophilic groups in the description of the patent application, however, no combination with amino compounds is described.

JP-2001-288242 discloses a curable and foamable formulation composed of epoxides, cyclic dithiocarbonates, acid anhydrides, and an amine-type catalyst. It is claimed that the composition shows volume expansion upon curing reaction. However, volume expansion is due to the formation of gases such as $CS_2$ and COS, caused by decomposition of dithiocarbonate. It is apparent that the formation of these harmful gases limits the application of the formulation. Furthermore, it also causes decrease in the mechanical strength of the cured material.

Therefore it was one major aim of the present invention to overcome the above drawback and to provide amine curing epoxy formulations with an improved adhesion performance compared to those known in the prior art. In particular formulations with low volume shrinkage upon curing, which are suitable in high precision applications, such as high precision adhesive bonding, should be provided. Such compositions should further show an enhanced pot life ensuring a high performance in processability. In addition they should lack foam formation during the curing reaction due to formation of harmful gases, thus providing rigid cured materials.

BRIEF SUMMARY OF THE INVENTION

Those problems have been solved by providing a curable composition comprising:

(A) at least one cyclic ether of general formula (I),

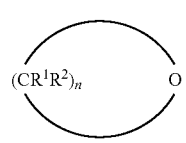

(I)

wherein $R^1$ and $R^2$ are the same or different within (I) and independently denote hydrogen, an aliphatic or heteroaliphatic group, an araliphatic or heteroaraliphatic group, a cycloaliphatic or heterocycloaliphatic group, or an aromatic or heteroaromatic group, and n is 2 or 3;

(B) at least one cyclic thiocarbonate of general formula (II),

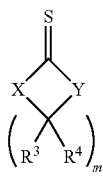

(II)

wherein $R^3$ and $R^4$ are the same or different within (II) and independently denote hydrogen, an aliphatic or heteroaliphatic group, an araliphatic or heteroaraliphatic group, a cycloaliphatic or heterocycloaliphatic group or an aromatic or heteroaromatic group, X and Y denote oxygen or sulfur and m is 2 to 5;

(C) at least one amine of general formula (III)

$$NR^5R^6R^7 \quad (III)$$

wherein $R^5$, $R^6$ and $R^7$ are the same or different within the molecule and independently denote hydrogen, an aliphatic or heteroaliphatic group, an araliphatic or heteroaraliphatic group, a cycloaliphatic or heterocycloaliphatic group, an aromatic or heteroaromatic group, or two of the residues form together a heterocycloaliphatic group; under the proviso that one or two of $R^5$, $R^6$ and $R^7$ denote hydrogen;

(D) at least one carboxylic acid of general formula (IV), $$R^8\text{—COOH} \quad (IV)$$

wherein $R^8$ denotes an aliphatic or heteroaliphatic group, an araliphatic or heteroaraliphatic group, a cycloaliphatic or heterocycloaliphatic group, or an aromatic or heteroaromatic group; and whereby instead of or in addition to (A) and (B) a hybrid compound (AB) of general formula (V):

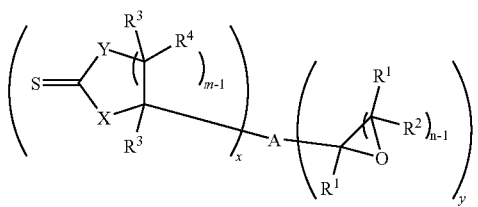

(V)

can be comprised, wherein $R^1$, $R^2$, $R^3$, $R^4$, m and n are defined as above and A denotes a bridging group selected from the group consisting of aliphatic or heteroaliphatic groups; araliphatic or heteroaraliphatic groups; cycloaliphatic or heterocycloaliphatic groups; and aromatic or heteroaromatic groups; and whereby instead of or in addition to (C) and (D) a hybrid compound (CD) of general formula (VI)

$$(HOOC)_m\text{—B—}(NR^5R^6)_n \quad (VI)$$

can be comprised wherein $R^5$ and $R^6$ are as defined above and B denotes a bridging group selected from the group consisting of "aliphatic or heteroaliphatic groups, araliphatic or heteroaraliphatic groups, cycloaliphatic or heterocycloaliphatic groups and aromatic or heteroaromatic groups".

DETAILED DISCUSSION OF CERTAIN EMBODIMENTS OF THE INVENTION

Component (A)

Figure 1:
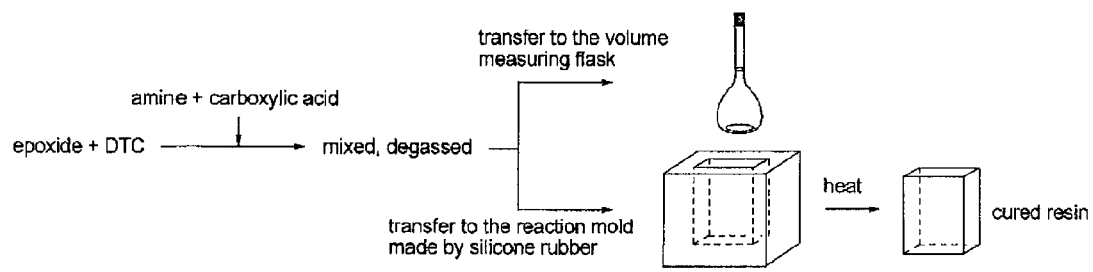
FIG. 1 is a drawing showing the general experimental procedure used in the Examples to determine volume shrinkage.

The cyclic ether of general formula (I) can be any chosen from epoxides and oxetanes. Besides the definitions above, those compounds can in particular contain the following functional groups within the residues $R^1$ and $R^2$: ether, cyclic ether, ester, amino, amide, imide, acid anhydride, urethane, urea, hydroxyl, carboxyl, thiol, (oxidated) sulfide, disulfide, sulfonyl ester, and sulfonyl amide moieties.

Preferable compounds (I) are those wherein at least one of all $R^1$ and $R^2$ residues is different from hydrogen, and even more preferable are those wherein all except one of the residues $R^1$ and $R^2$ denote hydrogen.

Most preferable compounds (I) are such wherein all except one of residues $R^1$ and $R^2$ denote hydrogen and the one, which is not hydrogen, contains one ore more further ether groups and/or one or more further cyclic ether groups as functional group besides one or more aromatic, aliphatic or araliphatic residues. Further it is possible that residues $R^1$ and/or $R^2$ are polymeric aromatic, aliphatic or araliphatic residues.

Preferable compounds (I) can be exemplified by the following general formula (Ia):

(Ia)

wherein D denotes an oxygen or

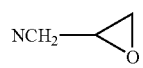

and $R^a$ is selected from the group consisting of a straight-chain or branched alkyl group with 1 to 18 carbon atoms; an aromatic or heteroaromatic group with 4 to 12 carbon atoms; a group with the structure

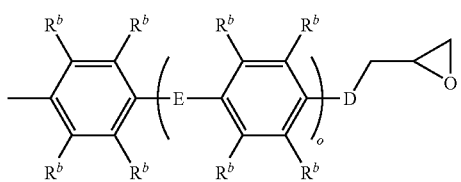

wherein all $R^b$ within the group are same or different and independently denote hydrogen or an alkyl group with 1 to 4 carbon atoms, and o is 0 or 1, and E is selected from the group consisting of a carbon-carbon single bond and $CR^c{}_2$ wherein $R^c$ is same or different and independently denotes hydrogen or an alkyl group with 1 to 4 carbon atoms; and D is defined as above; or $R^a$ is a group with the structure $R^d$—$SiR^eR^fR^g$ wherein $R^e$ and $R^f$ are the same or different, each of which denotes a straight-chain or branched alkoxy residue with 1 to 6 carbon atoms or an aryloxy or aralkyloxy residue, $R^g$ is different or the same as $R^e$ or $R^f$ or an aliphatic residue, an amino residue, a halogen residue, an aromatic or heteroaromatic residue, or an araliphatic or heteroaraliphatic residue, $R^d$ is a bridging group selected from the groups consisting of aliphatic, heteroaliphatic, araliphatic, heteroaraliphatic, aromatic and heteroaromatic groups.

Preferably $R^e$, $R^f$ and $R^g$ are the same or different, and each independently denotes a straight-chain or branched alkoxy residue with 1 to 4 carbon atoms, most preferably a methoxy or ethoxy residue. $R^d$ is preferably an alkylene chain with 1 to 6 carbon atoms, more preferably 2 to 4 carbon atoms, and most preferably a propylene group.

In case $R^a$ is a group with the structure $R^d$—$SiR^eR^fR^g$, at least two residues selected from $R^e$, $R^f$ and $R^g$ are apt to hydrolyze upon contact with moisture and therefore may form polycondensates. This kind of polycondensation provides a further enhancement of the properties of the curable composition.

Examples of such compounds are shown in Scheme 1-1a. Oligomers of these compounds having residual epoxide groups, e.g., oligomers prepared by thermal or ionic oligomerization, by addition reaction with thiol, by addition reaction with carboxylic acid, by addition with carboxylic anhydride, and by addition reaction with amine, can be similarly used.

Scheme 1-1a

Epoxides

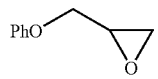

Glycidyl phenyl ether
(GPE)

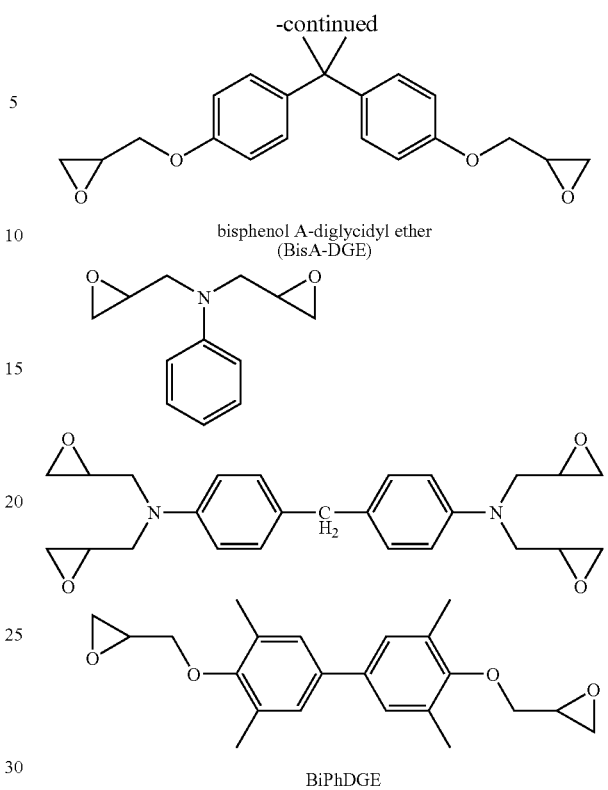

In case the cyclic ether of general formula (I) is missing, the carboxylic acid group containing compound of the composition would be unable to react with the cyclic ether to give the corresponding adduct in order to be covalently incorporated into the cured resin, or would be unable to be immobilized by ionic interaction with the corresponding crosslinked polyamine backbone formed by cyclic ether and amine. This should be avoided, since otherwise the acidic compound could be retained in the cured resin without any interaction with the crosslinked polymer backbone and easily released from the cured resin. Therefore the amount of the cyclic ether should be chosen in such manner that allows the carboxylic acid compound to react during the curing reaction and then the residual acid compound can be retained in the cured resin by salt formation with the crosslinked polyamine backbone.

Further in the absence of cyclic ethers and only small amounts of the amine compound, side reactions such as isomerization and decomposition of the cyclic thiocarbonate could occur in the presence of excessive carboxylic acid, which will result in inferior bonding and sealing properties after curing.

Component (B)

The cyclic thiocarbonate according to general formula (II) can, e.g., be a 5-8 membered cyclic monothiocarbonate, dithiocarbonate, or trithiocarbonate.

Since the cyclic mono- and dithiocarbonates can be obtained from the respective cyclic epoxides by reaction with COS or $CS_2$, and cyclic trithiocarbonates can be obtained from cyclic thioepoxides that are analogous to the cyclic epoxides, residues $R^3$ and $R^4$ typically have the same definitions as $R^1$ and $R^2$ except for the possible occurrence of a cyclic thiocarbonate in $R^3$ or $R^4$ instead of a cyclic ether.

Preferable compounds (II) can be exemplified by the following general formula (IIa):

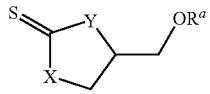
(IIa)

$R^a$ is selected from the group consisting of a straight-chain or branched alkyl group with 1 to 18 carbon atoms; an aromatic or heteroaromatic group with 4 to 12 carbon atoms; a group with the structure

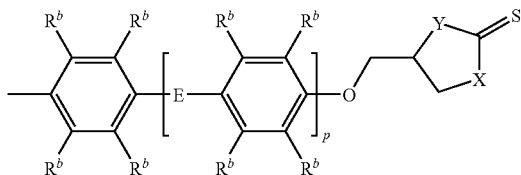

wherein all $R^b$ within the group are same or different and independently denote hydrogen or an alkyl group with 1 to 4 carbon atoms, and E is selected from the group consisting of a carbon-carbon single bond and $CRC_2^c$ wherein $R^C$ is same or different and independently denotes hydrogen or an alkyl group with 1 to 4 carbon atoms and p=0 or 1; or $R^a$ is a group with the structure $R^d$—$SiR^eR^fR^g$ wherein $R^e$ and $R^f$ are the same or different, each of which denotes a straight-chain or branched alkoxy residue with 1 to 6 carbon atoms or an aryloxy or aralkyloxy residue, $R^g$ is different or the same as $R^e$ or $R^f$ or an aliphatic residue, an amino residue, a halogen residue, an aromatic or heteroaromatic residue, or an araliphatic or heteroaraliphatic residue, $R^d$ is a bridging group selected from the groups consisting of aliphatic, heteroaliphatic, araliphatic, heteroaraliphatic, aromatic and heteroaromatic groups.

Preferably $R^e$, $R^f$ and $R^g$ are the same or different, and each independently denotes a straight-chain or branched alkoxy residue with 1 to 4 carbon atoms, most preferably a methoxy or ethoxy residue. $R^d$ is preferably an alkylene chain with 1 to 6 carbon atoms, more preferably 2 to 4 carbon atoms, and most preferably a propylene group.

In case $R^a$ is a group with the structure $R^d$—$SiR^eR^fR^g$, at least two residues selected from $R^e$, $R^f$ and $R^g$ are apt to hydrolyze upon contact with moisture and therefore may form polycondensates. This kind of polycondensation provides a further enhancement of the properties of the curable composition.

Examples for compounds of general formula (II) and (IIa) are shown in Scheme 1-1b.

Scheme 1-1b

DTCs

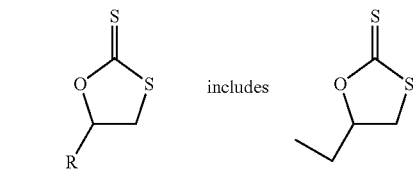

R = linear or branched alkyl chain

EDTC

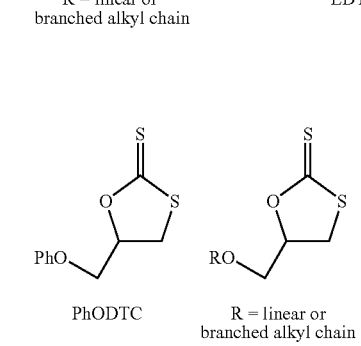

PhODTC

R = linear or branched alkyl chain

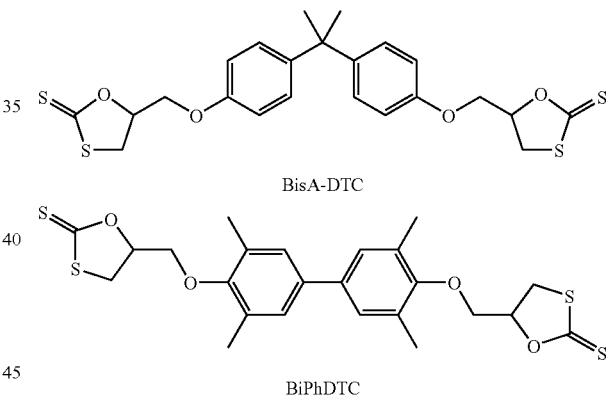

BisA-DTC

BiPhDTC

In the absence of cyclic thiocarbonates, the amine compound selectively reacts with the cyclic ether, which leads to larger shrinkage upon curing reaction than that observed for the curing reaction in the presence of the cyclic thiocarbonates.

Component (AB)

Instead of or in addition to mixing cyclic ether and cyclic thiocarbonate, it is possible to use hybrid molecules according to general formula (V). Such compounds can, e.g., be obtained by partial modification of those original cyclic ethers, which contain a further cyclic ether moiety in one of the residues $R^1$ or $R^2$, with COS or $CS_2$. Depending on the reaction conditions of such reaction, mixtures of starting compounds, hybrid compounds and completely reacted starting compounds are obtained. Since it is also possible to use such mixtures in the below described use of the present invention, further purification is not necessary.

Preferable bridging groups A are, e.g., groups of the following structure

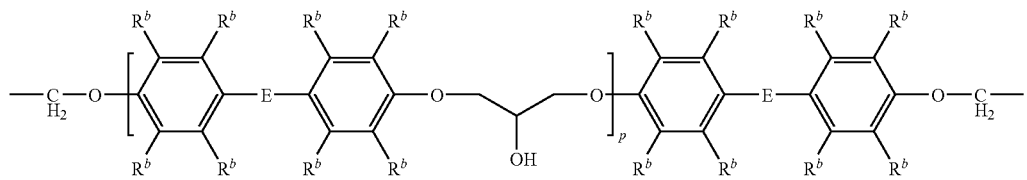

wherein E and $R^b$ have the same meaning as described above for the compounds of formulas (Ia) and (IIa), and p is 0 to 10.

Examples of such hybrid compounds are shown in Scheme 1-1c.

dissolve gradually in the course of the curing reaction. To ensure facile mixing and application processes, it is recommended to use polyamines having a number average molecular weight below 50,000 g/mol.

It was further found that a complete or partial replacement of the amine by a cyclodextrin-amine complex is effective to significantly improve adhesion strength without increasing of shrinkage. For the formation of an amine-cyclodextrin complex, α-, β- and γ-cyclodextrin may be used depending on the size and shape of the amine. However, β-cyclodextrin is suitable in most cases. Preferred amines in an amine-cyclodextrin complex are linear polyamines, for instance Jeffamine® polyamines.

Scheme 1-1c

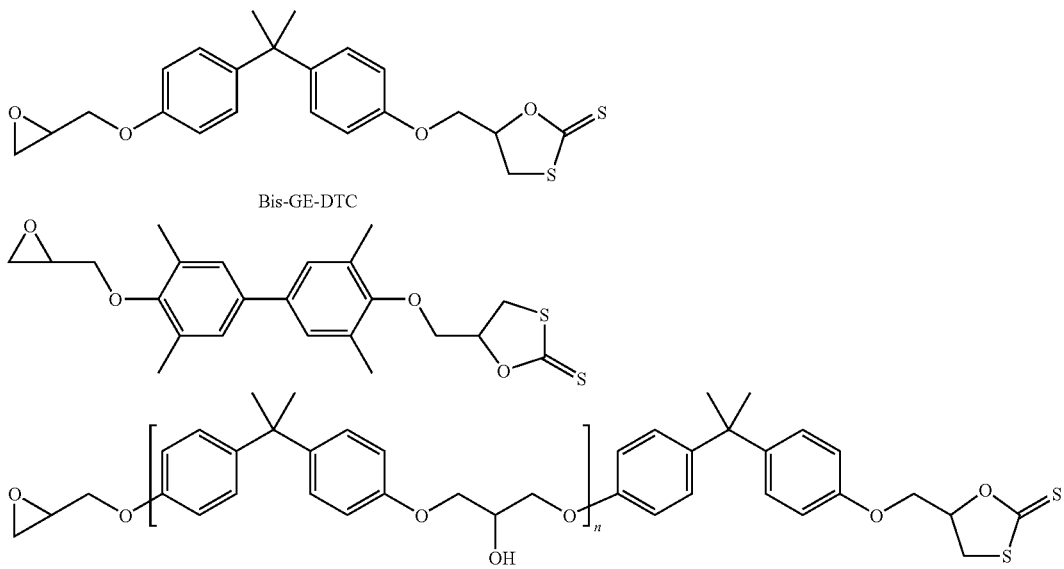

Component (C)

Amino compounds can be primary and secondary amines. However, primary and secondary amines can be mixed with other amines, like tertiary amines or heteroaromatic compounds with one or more basic nitrogen atoms (e.g., pyridine), if the amounts of the latter ones are minor amounts to control curing speed.

There is no restriction in the structure of the suitable amines, and even mixtures of two and more amino compounds can be used.

Most preferably alkyl or araliphatic amines are used. Such compounds are, e.g., shown in Scheme 1-1d. Adducts of these amines having residual amino groups can also be used. Such adducts are, e.g., epoxy-amine adducts, isocyanate-amine adducts, and carboxylic acid derivative-amine adducts.

Polyamines, such as poly(allylamine), poly(vinylamine), and polyethyleneimine are also suitable. The solubility depends on the combination of amine, carboxylic acid, and epoxide, however, they can be added even though they are not soluble in the corresponding formulation, if they are apt to Scheme 1-1d

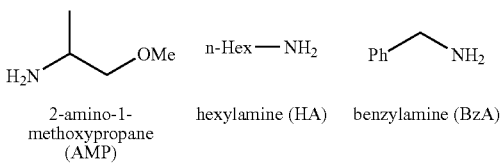

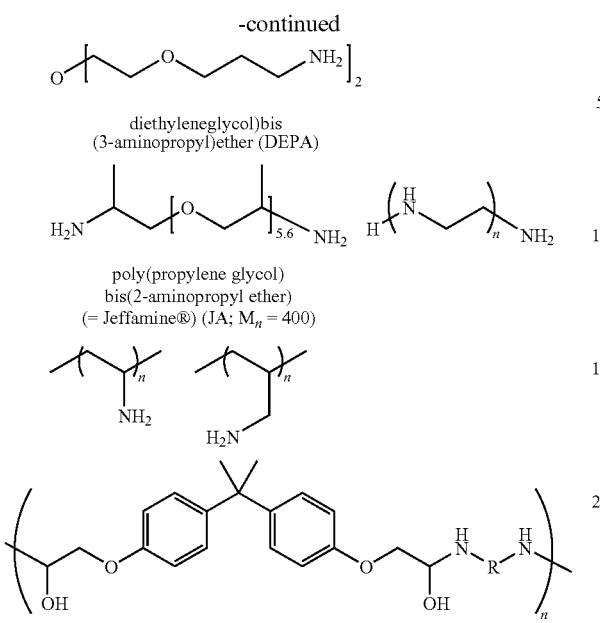

diethyleneglycol)bis
(3-aminopropyl)ether (DEPA)

poly(propylene glycol)
bis(2-aminopropyl ether)
(= Jeffamine®) (JA; $M_n$ = 400)

Component (D)

As organic acids, any compounds carrying a carboxyl group can be used. Examples of such compounds also include mono-, di-, and multifunctional carboxylic acids. Some of those acids are shown in Scheme 1-1e.

Even polycarboxylic acids are suitable in the curing compositions. The solubility depends on the combination of amine, carboxylic acid, and epoxide, however, they can be added even being not soluble in the corresponding formulation, if they dissolve gradually in the course of the curing reaction. To ensure facile mixing and application processes, it is recommended to use polycarboxylic acids having a number average molecular weight below 50,000 g/mol.

Scheme 1-1e

Acids

R = H: benzoic acid (BA)
R = t-Bu: 4-t-butylbenzoic acid (TBBA)
R = CH$_3$CONH: 4-acetamidobenzoic acid (ABA)

dichloroacetic acid (DCAA)   R = H: acetic acid (AA)
                             R = PhO: phenoxyacetic acid (PAA)

1-naphthoic acid (1-NA)   2-naphthoic acid (2-NA)

polycarboxylic acid
R = H or CH$_3$
homo- or co-polymers

The carboxylic acid component is effective in controlling the reaction between the amine component and the cyclic thiocarbonate, as well as between the amine component and the cyclic ether of the composition, due to a controlled release of the amine. Depending on the carboxylic acid/amine adduct it is possible that a reaction at room temperature is completely suppressed and heating is required. Other combinations of carboxylic acid and amine will just slowly react at room temperature (25° C.) and increase the pot life time of the compositions. Therefore the curing reaction rate will strongly depend on the carboxylic acid/amine combination and ambient temperature.

Component (CD)

Instead of using a combination of amine and acid, compounds having both amino and carboxy groups in a molecule can be used. All natural and artificial amino acids can be used. Some of those compounds are:

From the above explanations on the action of each component, it is apparent to the one skilled in the art, how to choose the amounts of components (A), (B), (C), (D), (AB) and (CD), respectively. The amounts of those compounds within the curable compositions may vary in broad ranges, still leading to satisfactory results. To give a rough outline of preferable ratios of functional groups within the curable compositions, the following ranges are provided, which are not intended to strictly limit the curable compositions according to the invention, to those ratios.

Preferably the ratio of [cyclic ether (mol)]:[cyclic thiocarbonate (mol)] is from 99:1 to 30:70, more preferably 95:5 to 20:80.

In case the ratio is higher the shrinkage-suppression effect of the cyclic thiocarbonate is not well attained. If the ratio is lower, it might be difficult to control the reaction between cyclic thiocarbonate with amine and therefore the corresponding formulation may not have a sufficient pot life. In order to attain a well-controlled reaction, it would be necessary to add a larger amount of organic acid, however, the amount of epoxide might not be sufficient to trap the excess amount of the organic acid.

The ratio of [amino group (mol)]:[carboxylic acid (mol)] is preferably from 95:5 to 5:95. More preferably the range is 90:10 to 50:50.

In case the ratio is higher the reaction of the cyclic ether with amino group and that of cyclic thiocarbonate with amine is hard to control using such a small amount of acid, and thus pot-life of the corresponding formulation is shortened. If the ratio is lower, an excess amount of acid will remain unreacted or cannot be immobilized via salt formation with the crosslinked polyamine backbone. In such cases, the free acid may catalyze decomposition and isomerization of the cyclic thiocarbonate.

The ratio of [cyclic ether (mol)]:[carboxylic acid (mol)] is preferably from 95:5 to 20:80. More preferably the range is 90:10 to 30:70.

In case the ratio is higher the reaction of the cyclic ether with amino group and that of cyclic thiocarbonate with amine may not be controlled by such a small amount of acid, and thus the pot-life of the corresponding formulation will be shortened. In addition, there is a possibility that some epoxy groups remain unreacted, resulting in a decrease in chemical and mechanical properties of the cured material. If the ratio is lower, an excess amount of acid will remain unreacted or cannot be immobilized via salt formation with the crosslinked polyamine backbone, and then the free acid may catalyze decomposition and isomerization of the cyclic thiocarbonate.

The preferable ratio of [amino group (mol)]:[cyclic thiocarbonate (mol)] is from 95:5 to 50:50. More preferably the range is 90:10 to 60:40.

In case the ratio is higher, the shrinkage-suppression effect of the cyclic thiocarbonate may not be well attained. If the ratio is lower most amino compounds are consumed by the reaction with the cyclic thiocarbonate, so that the amino compound and epoxide cannot undergo reaction, whereby the intrinsic properties of the epoxy-amine cured material may be lost.

A typical curable composition of the present invention, e.g., using the following representative components, comprises

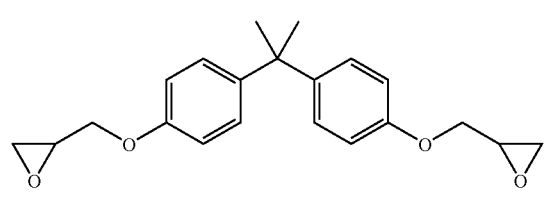

A: BisA-DGE
FW = 340

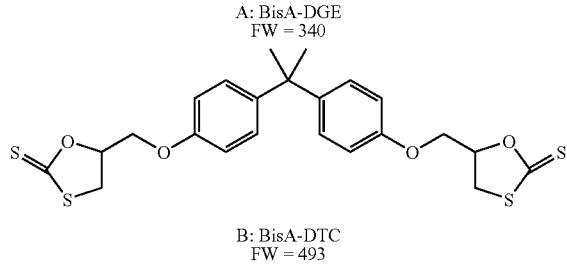

B: BisA-DTC
FW = 493

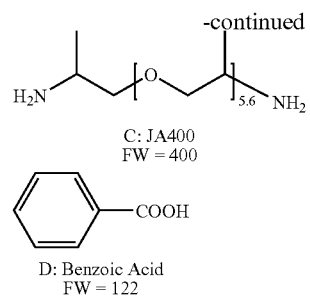

C: JA400
FW = 400

D: Benzoic Acid
FW = 122

(A) 5 to 60%, more preferably, 30 to 60%, (B) 1 to 50%, more preferably, 5 to 15%;

(C) 2 to 45%, more preferably, 20 to 35%;

(D) 1 to 40%, more preferably, 9 to 35%;

based on the total weight of the mixture of (A), (B), (C) and (D).

A typical curable composition of the present invention, e.g., using the following representative components, comprises

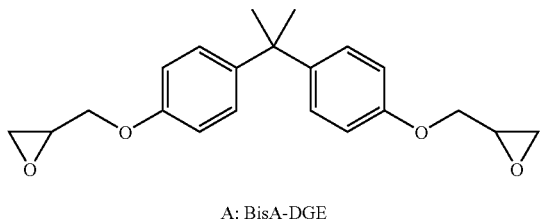

A: BisA-DGE
FW = 340

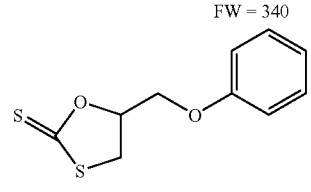

B: PhODTC
FW = 226

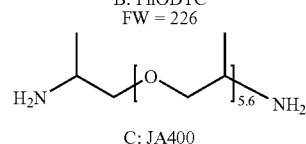

C: JA400
FW = 400

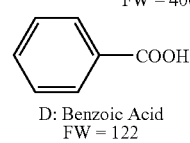

D: Benzoic Acid
FW = 122

(A) 7 to 65%, more preferably, 40 to 60%;

(B) 1 to 45%, more preferably, 2 to 15%;

(C) 2 to 45%, more preferably, 24 to 38%;

(D) 1 to 40%, more preferably, 5 to 35%;

based on the total weight of the mixture of (A), (B), (C) and (D).

In case (A) and (B) are completely substituted by (AB) a typical curable composition of the invention, using, e.g., the following representative components, comprises

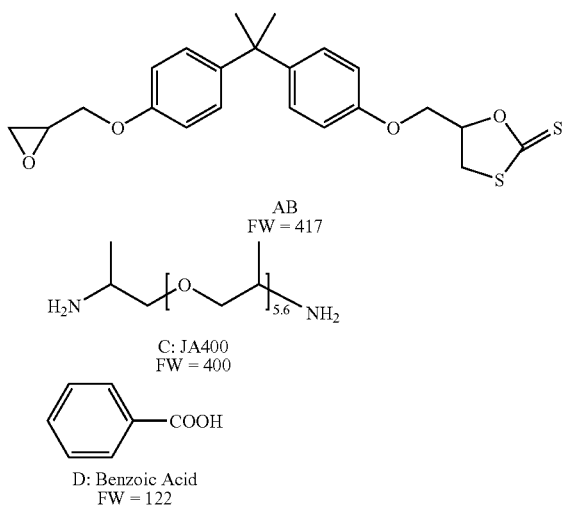

(AB) 40 to 70%, more preferably, 50 to 60%;

(C) 25 to 50%, more preferably, 27 to 42%;

(D) 1 to 30%, more preferably, 2 to 17%;

based on the total weight of the mixture of (AB), (C) and (D).

In case (C) and (D) are completely substituted by (CD) a typical curable composition of the invention, e.g., comprises:

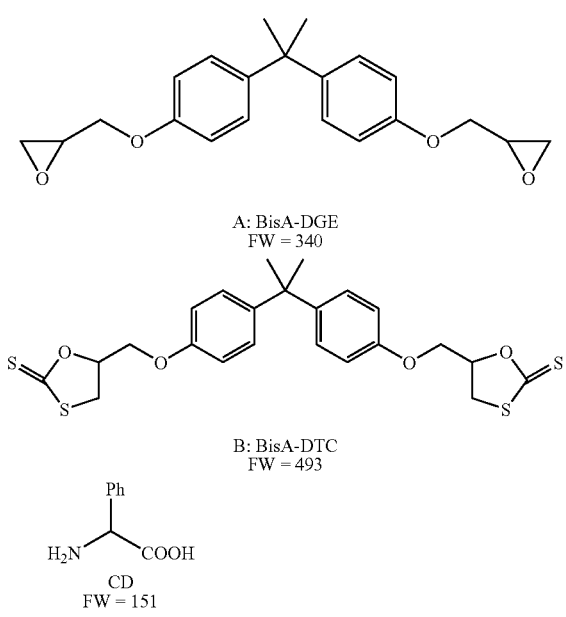

(A) 20 to 80%, more preferably, 52 to 76%;

(B) 1 to 30%, more preferably, 2 to 10%;

(CD) 20 to 50%, more preferably, 23 to 44%;

based on the total weight of the mixture of (A), (B) and (CD).

In case (A) and (B) are partially substituted by (AB) and (C) and (D) are partially substituted by (CD), a typical curable composition of the invention, e.g., using the above representative components, comprises:

(A) 15 to 65%, more preferably, 40 to 55%;

(B) 1 to 40%, more preferably, 5 to 20%;

(AB) 1 to 20%, more preferably, 5 to 15%;

(C) 5 to 40%, more preferably, 20 to 35%;

(D) 1 to 25%, more preferably, 5 to 15%;

(CD) 1 to 20, more preferably, 3 to 10%;

based on the total weight of the mixture of (A), (B), (AB), (C), (D) and (CD).

Although the order of mixing the components is not limited, it is preferred that the amine and the acid are mixed beforehand.

Therefore, the present invention also provides a method of making the curable compositions of the invention, comprising the pre-mixing of components (C) and (D) and adding this mixture to a mixture of (A) and (B) and/or (AB).

The maximum temperature at which latency of curing compositions of the present inventions is assured is about 50° C. However some formulations may start curing at lower temperatures. Preferably, the curing reaction is performed from 35° C. to 200° C., more preferably, from 50° C. to 160° C.

The present invention further provides the use of the curable compositions of the present invention in sealants, adhesives and coatings.

Suitable substrates on which the curable compositions can be applied are all substrates, which can be used with conventional epoxy-amine curing system. Examples for typical candidate substrates are, e.g., metals such as steel, aluminum, titanium, magnesium, brass, stainless steel, galvanized steel, like HDG-steel and EG-steel; silicates such as glass and quartz; metal oxides; concrete; and wood.

In the following the present invention is exemplified in more detail by the following examples.

EXAMPLES

Volume Shrinkage Behavior of the Epoxy-DTC-Amine-Acid Formulation

The general experimental procedure to determine the volume shrinkage is shown in the scheme of FIG. 1.

Epoxide and DTC are mixed and stirred under vacuum. If a homogeneous mixture is needed, the mixture can be heated at 100-140° C. Amine and carboxylic acid are added to the epoxide-DTC mixture at ambient temperature, and are mixed under vacuum. The density of the formulation "before curing ($d_{before\ curing}$)" is evaluated in a volume measuring flask at 20° C. The formulation prepared according to the procedure described above is poured into the reaction mold made by silicone rubber, and heated at 120° C. for 1 to 3 h or at 90° C. for 3 h to carry out the curing reaction. The density "after curing ($d_{after\ curing}$)" is measured by an electronic densimeter at 20° C.

The volume change value is calculated from the densities $d_{before\ curing}$ and $d_{after\ curing}$ by the equation, volume change (%)=$[(d_{before\ curing})/(d_{after\ curing})-1]*100$.

Example 1

Run 5 of Table 1-1

BisA-DGE (5.10 g, 15.0 mmol) was mixed with BisA-DTC (0.74 g, 1.5 mmol), and stirred at 100° C. until the mixture became homogeneous. JA (3.32 g, 8.3 mmol) was mixed with BA (2.01 g, 16.6 mmol) in bulk, and heated at 80° C., affording a pale yellowish viscous oil, which was added to the mixture of BisA-DGE and BisA-DTC at ambient temperature, and was mixed to obtain a homogeneous mixture, which was then degassed and dried under vacuum. 5 mL of the mixture was weighted in a volume measuring flask at 20° C. to evaluate the density before curing. The density before curing was 1.130. The mixture was poured into a silicone rubber mold, and heated at 120° C. for 1 h to obtain the cured resin as a yellowish solid. The density of the cured resin was measured by an electronic densimeter at 20° C. The density after the curing was 1.160. The volume change value was calculated to be −2.6%.

In analogy to the above procedure, Examples 2, 3 and 4 (runs 1, 2 and 3 of Table 1-1, respectively) have been carried out according to Table 1-1.

TABLE 1-1

Shrinkage values for the epoxy-DTC-amine-acid formulation

| run | hardener (amount/mmol) | DTC (amount/mmol) | amount of BisA-DGE (mmol) | volume change (%) |
|---|---|---|---|---|
| 1 | JA (7.5) | — | 15 | −5.3 |
| 2 | JA (9.0) | BisA-DTC (1.5) | 15 | −4.6 |
| 3 | JA (7.5) + BA (15) | — | 15 | −3.1 |
| 4 | JA (9.0) + BA (18) | PhODTC (3.0) | 15 | −2.7 |
| 5 | JA (8.3) + BA (16.6) | BisA-DTC (1.5) | 15 | −2.6 |

As can be learned from the above results in run 1 lacking DTC and benzoic acid (BA), the volume shrinkage is as high as −5.3%. Shrinkage-suppression effect of DTC can be seen in run 2. In run 3 the DTC amount is still zero, but a controlled reaction with the epoxy component BisA-DGE is guaranteed due to the presence of benzoic acid, resulting in a volume change of only −3.1%. Best results (volume shrinkage of −2.7 and −2.6, respectively) are shown in runs 4 and 5, making use of tions according to the present invention.

Preparation of a Hybrid Between a Cyclic Ether and a Cyclic Thiocarbonate

Example 5

The hybrids were prepared by partial modification of the epoxide with $CS_2$ as shown below. The mixtures contain an epoxy-DTC hybrid molecule, BisA-GE-DTC:

A typical procedure for this modification is:

To a THF solution (200 mL) of BADGE (51.1 g, 150 mmol, amount of epoxy moiety: 300 mmol) and lithium bromide (0.5 g, 6 mmol), a THF solution (160 mL) of carbon disulfide (2.4 mL, 40 mmol) was added dropwise at 0° C. The resulting mixture was stirred at ambient temperature for 21.5 h. By 1H-NMR analysis, the epoxy:DTC content was determined to be 100:10. Further addition of carbon disulfide (0.70 mL, 12 mmol) and stirring the mixture for an additional 7 h resulted in formation of the mixture with an epoxy:DTC content ratio of 100:15. The mixture was concentrated under reduced pressure. The residue was dissolved in ethyl acetate (300 mL), and washed with saturated aqueous solution of sodium chloride (200 mL) three times. The ethyl acetate layer was dried with sodium sulfate, filtered, and concentrated under reduced pressure. The obtained mixture was further dried under vacuum at 80° C. for 3 h. 1H-NMR analysis of the resulting epoxy-DTC mixture revealed that it contained epoxide and DTC moieties with a content ratio of 100:15. No other by-product was found by 1H-NMR analysis.

According to the above modification procedure, the following mixtures were prepared:

| epoxy-DTC mixture | $[epoxide(mol)]_0$ : $[CS_2(mol)]_0$ | amount of epoxide moiety (mmol/g) | Composition* (epoxy(mol):DTC(mol)) |
|---|---|---|---|
| 1 | 1:0.14 | 4.9 | 100:15 |
| 2 | 1:0.25 | 4.1 | 100:30 |

*Determined by 1H-NMR analysis.

Using the epoxy-DTC mixtures prepared, curing reactions can be carried out as shown for the non-hybrid systems.

The Effect of the Carboxylic Acid on the Curing Rate of Epoxy-DTC-Amine Formulation

Examples 6 to 9

Runs 1 to 4 in Table 2-1

The following results show that the addition of organic acid is effective to suppress the reactivity of amine in the formulations containing both an epoxide and DTC, i.e., the formulations do not cure at room temperature but at elevated temperature. In addition, these results show the complete consumption of all the components.

As an amine, 2-amino-1-methoxypropane (AMP) and as a carboxylic acid benzoic acid (BA) were used. PhODTC was used as a DTC additive. The feed ratio GPE:PhODTC:AMP or AMP+BA mixture was controlled according to the equation: $2*[GPE]_0 + 2*[PhODTC]_0 = [AMP \text{ or } AMP+BA]_0$. All reactions were performed in a sealed glass ampoule in bulk. The conversion was determined by $^1$H-NMR spectrum in $CDCl_3$. In Table 2-1, all examples are listed.

As can be seen from Table 2-1, AMP reacts with DTC even at room temperature, while AMP+BA does not. Since AMP+BA does not react with epoxide at room temperature, the mixture consisting of epoxide, DTC, AMP, and BA can be stored at room temperature. Upon heating the formulation at 100° C., all of the components successfully react to give the corresponding cured material.

TABLE 2-1

Reactivity of the epoxy-DTC-amine-acid formulation

| run | GPE (mmol) | PhODTC (mmol) | AMP (mmol) | BA (mmol) | Temp (° C.) | Conversion after 1 h GPE (%) | Conversion after 1 h PhODTC (%) | Conversion after 9 h GPE (%) | Conversion after 9 h PhODTC (%) |
|---|---|---|---|---|---|---|---|---|---|
| 1 | 3.0 | 0.3 | 3.3 | — | r.t. | 0 | 100 | 0 | 100 |
| 2 | 3.0 | 0.3 | 3.3 | — | 120 | 100 | 100 | — | — |
| 3 | 3.0 | 0.3 | 3.3 | 3.3 | r.t. | 0 | 0 | 0 | 0 |
| 4 | 3.0 | 0.3 | 3.3 | 3.3 | 120 | 100 | 100 | — | — |

Adhesion Performance of the Epoxy-DTC-Amine-Acid Formulation

Examples 10 to 13

Runs 1 to 4 in Table 3-1

Tensile shear strength of the epoxy resin cured with epoxide, DTC, amine, and carboxylic acid was evaluated under the following conditions: test method, ASTM D1002; apparatus, Model 4204 manufactured by INSTRON, U.S.A.; specimens, grit blasted mild steel lap-shear, 25.4×101.6×1.6 mm (TS101) or grit blasted minum lap-shear, 25.4×101.6×1.6 mm (TS021); cure condition, 120° C., 1 h; condition, 23° C., 50% RH; and crosshead speed, 2 mm/min.

Figure 2:
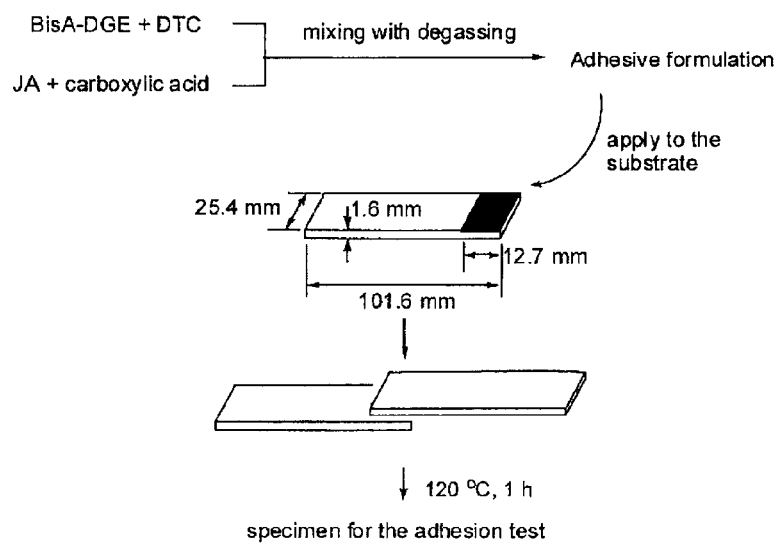
FIG. 2 is a drawing showing the adhesive components and sample preparation procedure for the adhesion test of Examples 10-15 and Tables 3-1 and 3-2.
Figure 3:
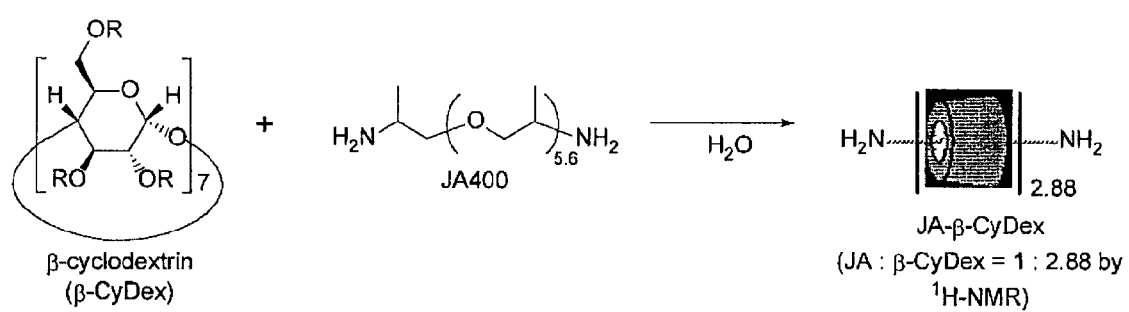
FIG. 3 is a drawing of a reaction for producing the interpenetrate complex of β-cyclodextrin (β-CyDex) with Jeffamine 400 (JA).

The adhesive components and preparation procedure are described in the scheme shown in FIG. 2.

BisA-DGE was used as a typical representative for epoxide. As DTC compounds, PhODTC and BisA-DTC were used. As hardeners, JA, (JA+2BA), and (JA+21-NA) were used. The procedure for the adhesive formulation is similar to that of the epoxy one. The curing reaction was performed at 120° C. for 1 h. Table 3-1 summarizes the feed conditions and results.

TABLE 3-1

Tensile shear strength

| run | BisA-DGE (eq.) | DTC (eq.) | Hardener (eq.) | Specimen | Tensile shear strength (N/mm²) |
|---|---|---|---|---|---|
| 1 | 3.0 | PhODTC 0.6 | JA (1.8) + BA (3.6) | Steel | 8.8 |
| 2 | 3.0 | PhODTC 0.6 | JA (1.8) + BA (3.6) | Aluminum | 5.8 |
| 3 | 3.0 | BisA-DTC 0.3 | JA (1.8) + BA (3.6) | Steel | 10.8 |
| 4 | 3.0 | BisA-DTC 0.3 | JA (1.8) + BA (3.6) | Aluminum | 9.4 |

Examples 14 and 15

Table 3-2

Measurements according to the procedure as described for Examples 10 to 13 have been carried out with a composition containing a cyclodextrin-Jeffamine® complex (Example 15).

TABLE 3-2

Table 3-2: Tensile shear strength

| Example | BisA-DGE (eq.) | DTC (eq.) | Hardener (eq.) | Specimen | Tensile shear strength (N/mm²) |
|---|---|---|---|---|---|
| 14 | 3.0 | BisA-DTC (0.15) | JA (1.1) + BA (2.2) | Steel | 15.6 |
| 15 | 3.0 | BisA-DTC (0.15) | JA (1.08) + JA-β-CyDex (0.02) + BA (2.2) | Steel | 18.1 |

Curing conditions: 120° C., 1 h

The interpenetrate complex of β-cyclodextrin (β-CyDex) with Jeffamine® 400 ("JA") was prepared as follows: JA (13.04 g, 32.60 mmol) was added to a saturated aqueous solution of β-CyDex (18.50 g, 16.30 mmol in 100 ml H$_2$O) at ambient temperature, and stirred overnight. The precipitates were collected, washed with small amount of H$_2$O, and dried under vacuum for 24 h to obtain JA-β-CyDex as a white solid. Yield: 10.77 g, 51.9% (based on the stoichiometry of the interpenetrate complex). The stoichiometry of JA-β-CyDex was determined by $^1$H-NMR spectroscopy, and was calculated to be 1:2.88 by comparing the integration of the signals assigned to CH$_3$ of JA and C(1)H of β-CyDex.

By a partial replacement of JA itself with its CyDex-complex, the adhesion strength was further improved, presumably due to formation of a hydrogen-bonding network from the hydroxyl groups of CyDex.

What is claimed is:

1. A curable composition comprising:

(A) at least one cyclic ether of general formula (I),

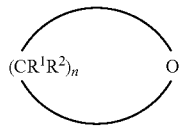

(I)

wherein R$^1$ and R$^2$ are the same or different within (I) and independently denote hydrogen, an aliphatic or heteroaliphatic group, an araliphatic or heteroaraliphatic group, a cycloaliphatic or heterocycloaliphatic group, or an aromatic or heteroaromatic group, and n is 2 or 3;

(B) at least one cyclic thiocarbonate of general formula (II),

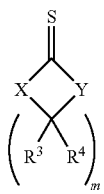

(II)

wherein R$^3$ and R$^4$ are the same or different within (II) and independently denote hydrogen, an aliphatic or heteroaliphatic group, an araliphatic or heteroaraliphatic group, a cycloaliphatic or heterocycloaliphatic group or an aromatic or heteroaromatic group, X and Y denote oxygen or sulfur, and m is 2 to 5;

(C) at least one amine of general formula (III)

NR$^5$R$^6$R$^7$        (III)

wherein R$^5$, R$^6$ and R$^7$ are the same or different within (III) and independently denote hydrogen, an aliphatic or heteroaliphatic group, an araliphatic or heteroaraliphatic group, a cycloaliphatic or heterocycloaliphatic group, an aromatic or heteroaromatic group, or two of R$^5$, R$^6$ or R$^7$ form together a heterocycloaliphatic group, with the proviso that one or two of R$^5$, R$^6$ and R$^7$ denote hydrogen;

(D) at least one carboxylic acid of general formula (IV),

R$^8$—COOH        (IV)

wherein R$^8$ denotes an aliphatic or heteroaliphatic group, an araliphatic or heteroaraliphatic group, a cycloaliphatic or heterocycloaliphatic group, or an aromatic or heteroaromatic group; and whereby instead of or in addition to (A) and (B) a hybrid compound (AB) of general formula (V)

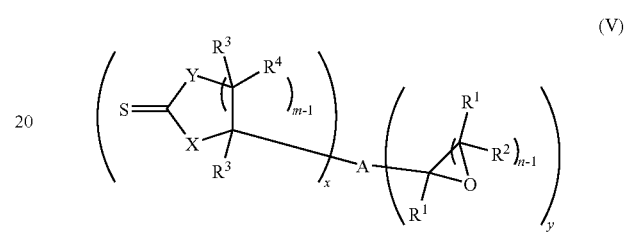

(V)

can optionally comprise part of the curable composition, wherein R$^1$, R$^2$, R$^3$, R$^4$, m and n are defined as above and A denotes a bridging group selected from the group consisting of aliphatic and heteroaliphatic groups; araliphatic and heteroaraliphatic groups; cycloaliphatic and heterocycloaliphatic groups; and aromatic and heteroaromatic groups; and whereby instead of or in addition to (C) and (D) a hybrid compound (CD) of general formula (VI)

HOOC—B—NR$^5$R$^6$        (VI)

can optionally comprise part of the curable composition, wherein R$^5$ and R$^6$ are as defined above and B denotes a bridging group selected from the group consisting of aliphatic or heteroaliphatic groups; araliphatic or heteroaraliphatic groups; cycloaliphatic or heterocycloaliphatic groups and aromatic or heteroaromatic groups.

2. A curable composition according to claim 1 wherein (A) has the general formula (Ia)

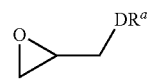

(Ia)

wherein D denotes an oxygen or

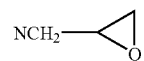

and

R$^a$ is selected from the group consisting of straight-chain and branched alkyl groups with 1 to 18 carbon atoms; aromatic and heteroaromatic groups with 4 to 12 carbon atoms; groups with the structure

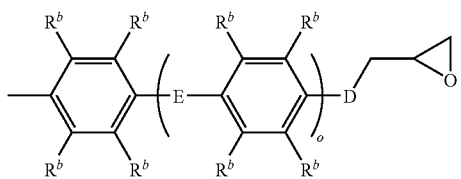

wherein all $R^b$ within the group are same or different and independently denote hydrogen or an alkyl group with 1 to 4 carbon atoms, and o is 0 or 1, and E is selected from the group consisting of carbon-carbon single bonds and $CR^c_2$ wherein $R^c$ is same or different and independently denotes hydrogen or an alkyl group with 1 to 4 carbon atoms; and D is defined as above; and groups with the structure $R^d$—$SiR^eR^fR^g$ wherein $R^e$ and $R^f$ are the same or different, each of which denotes a straight-chain or branched alkoxy residue with 1 to 6 carbon atoms or an aryloxy or aralkyloxy residue, $R^g$ is different or the same as $R^e$ or $R^f$ or an aliphatic residue, an amino residue, a halogen residue, an aromatic or heteroaromatic residue, or an araliphatic or heteroaraliphatic residue, and $R^d$ is a bridging group selected from the groups consisting of aliphatic, heteroaliphatic, araliphatic, heteroaraliphatic, aromatic and heteroaromatic groups.

3. A curable composition according to claim 1, wherein (B) has the general formula (IIa)

(IIa)

wherein $R^a$ is selected from the group consisting of straight-chain and branched alkyl groups with 1 to 18 carbon atoms; aromatic and heteroaromatic groups with 4 to 12 carbon atoms; groups with the structure

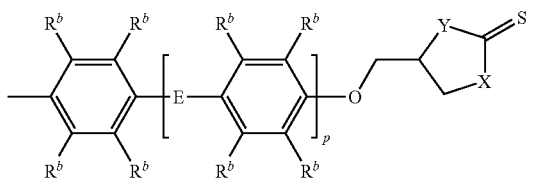

wherein all $R^b$ within the group are same or different and independently denote hydrogen or an alkyl group with 1 to 4 carbon atoms,
and E is selected from the group consisting of a carbon-carbon single bond and $CR^c_2$ wherein $R^c$ is same or different and independently denotes hydrogen or an alkyl group with 1 to 4 carbon atoms and p=0 or 1; and groups with the structure $R^d$—$SiR^eR^fR^g$ wherein $R^e$ and $R^f$ are the same or different, each of which denotes a straight-chain or branched alkoxy residue with 1 to 6 carbon atoms or an aryloxy or aralkyloxy residue, $R^g$ is different or the same as $R^e$ or $R^f$ or an aliphatic residue, an amino residue, a halogen residue, an aromatic or heteroaromatic residue, or an araliphatic or heteroaraliphatic residue, and $R^d$ is a bridging group selected from the group consisting of aliphatic, heteroaliphatic, araliphatic, heteroaraliphatic, aromatic and heteroaromatic groups.

4. A curable composition according to claim 1, wherein (C) has the general formula (IIIa)

$NHR^6R^7$ (IIIa)

wherein $R^6$ and $R^7$ are the same or different within the molecule and independently denote hydrogen; a branched or straight-chain alkyl group, optionally containing oxygen and/or NH; or an aralkyl group, optionally containing oxygen and/or NH; and any of $R^6$ and $R^7$ optionally comprise one or more OH and/or $NH_2$ groups.

5. A curable composition according to claim 1, wherein $R^8$ in (D) is selected from the group consisting of branched or straight-chain alkyl groups; aryl groups; aralkyl groups; and alkaryl groups; and $R^8$ optionally comprises one or more halogen atoms and/or COOH groups.

6. A curable composition according to claim 1, wherein (AB) comprises a bridging group A having the structure

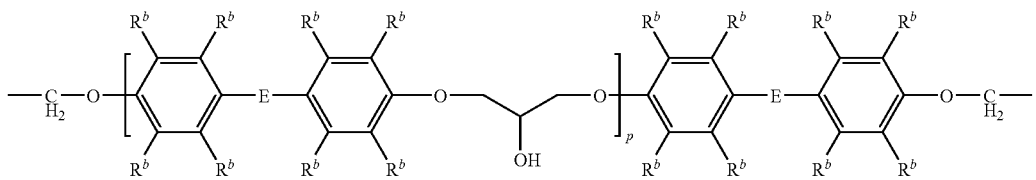

wherein $R^b$ within the bridging group A are same or different and independently denote hydrogen or an alkyl group with 1 to 4 carbon atoms,
E is selected from the group consisting of a carbon-carbon single bond and $CR^c_2$ wherein $R^c$ is same or different and independently denotes hydrogen or an alkyl group with 1 to 4 carbon atoms and p is 0 to 10.

7. A curable composition according to claim 1, wherein (CD) is selected from the group consisting of naturally occurring amino acids and artificial amino acids.

8. A curable composition according to claim 1, wherein the molar ratios between the following groups:
cyclic ether groups, present in (A) and/or (AB),
cyclic thiocarbonate groups, present in (B) and/or (AB),
amino groups, present in (C) and/or (CD), and
carboxy groups, present in (D) and/or (CD)
are as follows:

[cyclic ether (mol)]:[cyclic thiocarbonate (mol)]=99:1 to 30:70;
[amino group (mol)]:[carboxylic acid (mol)]=95:5 to 5:95;
[cyclic ether (mol)]:[carboxylic acid (mol)]=95:5 to 20:80; and
[amino group]:[cyclic thiocarbonate]=95:5 to 50:50.

9. A curable composition according to claim 1, wherein the molar ratios between the following groups:
cyclic ether groups, present in (A) and/or (AB),
cyclic thiocarbonate groups, present in (B) and/or (AB),
amino groups, present in (C) and/or (CD), and
carboxy groups, present in (D) and/or (CD)
are as follows:
[cyclic ether (mol)]:[cyclic thiocarbonate (mol)]=95:5 to 80:20;
[amino group (mol)]:[carboxylic acid (mol)]=90:10 to 50:50;
[cyclic ether (mol)]:[carboxylic acid (mol)]=90:10 to 30:70; and
[amino group]:[cyclic thiocarbonate]=90:10 to 60:40.

10. A method for preparing a curable composition in accordance with claim 1, comprising pre-mixing components (C) and (D) to form a mixture and adding said mixture to a mixture of (A) and (B) and/or (AB).

11. A method of sealing, coating or adhering a substrate, said method comprising applying a curable composition in accordance with claim 1 to said substrate and curing said curable composition.

12. A curable composition according to claim 1 wherein component (C) is at least in part substituted by a complex of component (C) and a cyclodextrin selected from α-cyclodextrin, β-cyclodextrin or γ-cyclodextrin.

13. A curable composition according to claim 12, wherein the cyclodextrin is β-cyclodextrin and the amine is an amine represented by the general formula (IIIa)

$$NHR^6R^7 \quad\quad\quad (IIIa)$$

wherein $R^6$ and $R^7$ are the same or different within (IIIa) and independently denote hydrogen; a branched or straight-chain alkyl group, optionally containing oxygen and/or NH; or an aralkyl group, optionally containing oxygen and/or NH; any of $R^6$ and $R^7$ optionally comprising one or more OH and/or $NH_2$ groups.

14. A curable composition according to claim 1, comprising at least one poly(propylene glycol) bis(2-aminopropyl ether.

15. A curable composition according to claim 1, comprising at least one aromatic carboxylic acid.

16. A curable composition according to claim 1, comprising at least one bisphenol A-diglycidyl ether.

17. A curable composition according to claim 1, comprising at least one compound selected from the group consisting of bisphenol A-dithiocarbonates, phenol-dithiocarbonates, and bisphenol A-glycidyl ether-dithiocarbonates.

* * * * *